United States Patent [19]
Albiez et al.

[11] Patent Number: 5,725,399
[45] Date of Patent: Mar. 10, 1998

[54] BATTERY CABLE TERMINAL FOR VEHICLES

[75] Inventors: Robert Albiez, Reichertshofen; Maximilian Gröbmair, Dietramszell; Alfred Krappel, Ismaning; Günther Nölle, Lörrach, all of Germany

[73] Assignee: Auto-Kabel Hausen GmbH & Co. Betriebs-KG, Hausen I.W., Germany

[21] Appl. No.: 663,159

[22] PCT Filed: Jan. 31, 1995

[86] PCT No.: PCT/EP95/00335

§ 371 Date: Aug. 1, 1996

§ 102(e) Date: Aug. 1, 1996

[87] PCT Pub. No.: WO95/21454

PCT Pub. Date: Aug. 10, 1995

[30] Foreign Application Priority Data

Feb. 1, 1994 [DE] Germany ............... 44 02 994.2
Jul. 18, 1994 [DE] Germany ............... 44 25 307.9

[51] Int. Cl.⁶ ............................................. H01R 4/42
[52] U.S. Cl. ............................. 439/762; 439/923; 439/158
[58] Field of Search ............................. 439/158, 159, 439/475, 923, 952

[56] References Cited

U.S. PATENT DOCUMENTS

| | | |
|---|---|---|
| 1,150,919 | 8/1915 | Willard . |
| 1,191,548 | 7/1916 | Willard . |
| 1,300,431 | 4/1919 | Luthy . |
| 1,494,954 | 5/1924 | Crouch . |
| 3,118,986 | 1/1964 | Lewis et al. . |
| 3,536,876 | 10/1970 | Lastinger et al. ............ 439/923 X |
| 3,830,331 | 8/1974 | Piazza ............ 439/923 X |
| 4,740,178 | 4/1988 | Badenhorst et al. . |
| 5,408,743 | 4/1995 | Tournier et al. . |

FOREIGN PATENT DOCUMENTS

| | | |
|---|---|---|
| 0 398 307 A1 | 11/1990 | European Pat. Off. . |
| 0 563 947 A1 | 10/1993 | European Pat. Off. . |
| 2 616 958 A1 | 12/1988 | France . |
| 1 260 590 | 2/1968 | Germany . |
| 23 27 261 A1 | 1/1975 | Germany . |
| 25 39 675 A1 | 3/1976 | Germany . |
| 21 31 479 C3 | 9/1977 | Germany . |
| 3037 502 C2 | 11/1983 | Germany . |
| 84 33 042.2 | 2/1986 | Germany . |
| 38 15 555 A1 | 12/1988 | Germany . |
| 42 08 011 A1 | 9/1993 | Germany . |
| 43 05 819 A1 | 9/1993 | Germany . |
| 42 17 453 C2 | 4/1994 | Germany . |
| 94 01 486.8 | 5/1994 | Germany . |
| 44 04 909 A1 | 8/1994 | Germany . |
| 44 30 284 A1 | 6/1995 | Germany . |
| 44 02 994 A1 | 8/1995 | Germany . |
| 44 25 307 A1 | 1/1996 | Germany . |
| 44 22 249 A1 | 2/1996 | Germany . |
| 559 923 | 3/1944 | United Kingdom . |

OTHER PUBLICATIONS

O. Richter R.v. Voss, *Bauelemente Der Feinmechanik*, Verlag Technik Berlin, 1952, pp. 135–138.

*Primary Examiner*—Neil Abrams
*Assistant Examiner*—Daniel Wittels
*Attorney, Agent, or Firm*—Panitch Schwarze Jacobs & Nadel, P.C.

[57] ABSTRACT

A battery cable terminal (2') is integrally combined with the housing (11) of a safety separator (2) to form a compact unit. An on-board cable (starter cable 4) is fastened to the separator (2) in such a way as to be separated by an incorporated powered drive element (6) upon accident-conditioned actuation thereof through a control pulse from an accident sensor (airbag collision safety system 1) and in such a way as to prevent by the use a spacer (14, 14') other electroconductive touch contacts.

11 Claims, 6 Drawing Sheets

BATTERY CABLE TERMINAL FOR VEHICLES

FIELD OF THE INVENTION

The invention relates to a battery cable terminal for vehicles, with a clamping bore for retention to the battery post, including an attached safety separator which is located between a battery and an on-board cable end of the vehicle and is operable conditioned by an accident, and further including a housing of the separator.

BACKGROUND OF THE INVENTION

DE 30 37 502 C2 has disclosed a safety separator which is detachably fastened to the cable terminal and has an inertia element connected to one of the contacts. This device of elaborate design has functional drawbacks resulting from structural tolerances, ageing and a system-conditioned directional sensitivity. Through this directional sensitivity, the contact separation takes place with sufficient dependability only if and when in the event of an accident there is an impact acceleration in a preferred direction. If the accident-conditioned impact acceleration is in different directions, contact separation is not adequately ensured although the severity of an accident might so require. This also applies for the so-called rear collision where the car is crashed into from behind, because the inertia element of the separator fails to be adequately deflected with the necessary reliability and therefore there is then no dependable contact separation.

SUMMARY OF THE INVENTION

The object underlying the invention is therefore to provide a cable terminal of the kind mentioned at the outset with a separator, wherein the device is of simple design and reliably ensures any necessary contact separation independently of a specific direction of impact in the event of an accident, even after lengthy use of the vehicle.

To accomplish this object, the cable terminal stated at the outset is characterized in that a fixed part of the housing of the separator is integral with the cable terminal and secures a cable end of the on-board system by means of a separable fastening device, and that the configuration and arrangement of a powered drive element between fixed walls of the housing and the cable end is such that when said drive element is actuated the fixation of the cable end is released, wherein the powered drive element has a control line effecting actuation of said drive element in dependance on an accident sensor separately from and/or together with other safety systems, as required.

The integral configuration of the housing of the safety separator with the battery cable terminal and the use of a powered drive element permit the separator to be formed without any additional fixtures and with little structural complexity so as to be operationally dependable and of unchanged efficiency even when the vehicle has been in lengthy use. Furthermore the extent of work involved in assembly is less in comparison to a separate arrangement. The weight of the separator and its housing integral with the cable terminal can be supported by means of the mount on the battery connecting terminal; in addition however the device can also be located in position by support against the external surface of the battery. By this means the arrangement displays particularly high mechanical stability without the structural complexity involved by the separator having its own fixtures.

It is advantageous if a pyrotechnically acting, powered drive element is provided. The use in vehicles of a pyrotechnical, powered drive element controlled by an accident sensor is known and field-proven e.g. with airbags. In the present application, however, the intention is not that a large volume of gas be generated in the minimum of time, but the action of pressure force is required and utilized. Consequently other powered drive elements can also be employed, such as spring energy accumulators, gas accumulators and/or air-hydraulic accumulators.

German laid open print No. 21 31 479 has disclosed the use of a pyrotechnical, powered drive element in a safety device for smashing a window pane. This powered drive element is triggered at the same time as the airbag and serves to reduce the pressure increase caused inside the vehicle by the airbag.

In the case of the present invention, it is also to be possible for the safety separator to be actuated independently from the airbag. Independently signifies both time-wise and functionally. Time-wise the safety separator is to be triggered and actuated after the other systems actuated in the event of an accident, particularly when their current requirement is over. These systems include, by way of example, a central door locking system, an emergency radio signal and several airbags for driver and passengers. The safety separator is to be triggered functionally independently from e.g. the airbag, particularly in the event of a rear collision. Furthermore, actuation is to be possible if no airbag is available. The prerequisite for the functions embodied by the invention is only a suitable accident sensor which evaluates the severity of a vehicle accident directionally independently.

In one embodiment, the fastening device for the cable end takes the form of a press fit, form fit, rupture joint, soldered or other equivalent joint that is disconnectable with high separating force and enables a particularly simple mechanical design. The present invention also discloses the use of two substantially cylindrical mounts arranged generally at right angles to each other as supports for the cable end and the power drive element which allows the disconnectable joints to be formed and arranged in accordance with the respective structural and spatial conditions. The invention also provides a disconnectable joint which consists of one of a cylindrical or terminally flared projection located on the cable end sleeve transversely of the main axis, with a cylindrical and/or undercut seat arranged coaxially with the main axis of the power drive element in order to form a press fit or form fit to allow case of fabrication. The integral rupture joint may also be arranged laterally spaced from the main axis of the power drive element so that the supporting point of the power drive element on the cable end acts as a lever arm relative to the rupture joint.

In another preferred embodiment of the invention, the cable end and the powered drive element are arranged in a cylindrical mount having an inner end and an outer end, with the cable end being arranged at the outer end of the cylindrical mount, and the power drive element being arranged at the inner end of the mount such that the power drive element is supported against the inner end of the mount and against the inner end of the cable end such that when the power drive element is actuated, the cable end is pushed out of the mount in order to provide an overall arrangement which is advantageous from the viewpoint of production engineering through the coaxiality of the two cylindrical housing members and the cable end.

In another embodiment of the present invention, the cable end of the starter cable is connected to the positive terminal of the battery, and a screw terminal which is independent of the starter cable connection is provided and serves for other fused on-board cables such that on the one hand the high current intensity-carrying, but unfused starter cable is connected to the safety separator and on the other hand the other relatively low current intensity-carrying, but electrically fused on-board cables are separately connected directly to the cable terminal. This embodiment of functional and safety advantage hence represents a particularly expedient development allowing certain equipment using only low current intensities to remain in operation after actuation of the separator.

In another embodiment, the present invention provides a spacer between the cable terminal and the cable end which is configured such that when the cable end is released, any contact of the cable end with the cable terminal is precluded. This is a likewise important and expedient development of the invention, attaining security against renewed contact touch, attended by dangerous sparking, of the separated cable end with current-carrying outer surfaces of the cable terminal. Therefore after the cable has separated in accordance with the invention, there can be no further contact or even sparking and a resultant fire hazard.

In a particularly advantageous embodiment of the invention, the spacer comprises an insulating bush which is fastened to a stepped, cylindrical, free end era projection on a cable end sleeve, projects beyond the free end, and is disconnectable together with the cable end and the cable end sleeve from the cable terminal by means of the separator, attaining good elimination of any dangerous contact touch without moving parts, possibly in co-operation with an insulating cover common with battery terminals.

In another embodiment of the invention, the battery cable terminal includes a clamping bore defined therethrough for attachment to a battery post. A safety separator is incorporated in the cable terminal which is adapted to be located between the battery and an on-board cable, and is operable in response to an accident. The safety separator includes a housing having a fixed part which is integral with the cable and a separable part which is one of connected to and formed by the cable end. The separable part is held to the fixed part by means of a separable fastening device. A pyrotechnically actuated, powered drive element is arranged between the separable part and the fixed part. The powered drive element is adapted to act on both the separable and fixed parts in opposite directions for separation of the separable part. A control line is connected to the powered drive element which affects actuation of the drive element in dependence on an accident sensor.

BRIEF DESCRIPTION OF THE DRAWINGS

Exemplary embodiments of the invention are depicted in the drawings which show, partly in schematized form, in FIG. 1 a block diagram setting out the basic structure and arrangement of the battery cable terminal for vehicles as is embodied by the invention, including its connections to battery or accumulator and accident sensor, FIG. 2 a first embodiment of the battery cable terminal according to the invention, with a cable end disconnectably fastened via a rupture joint, FIG. 3 an embodiment with a cylindrical press fit.

DETAILED DESCRIPTION OF PREFERRED EMBODIMENTS

Figure 1:
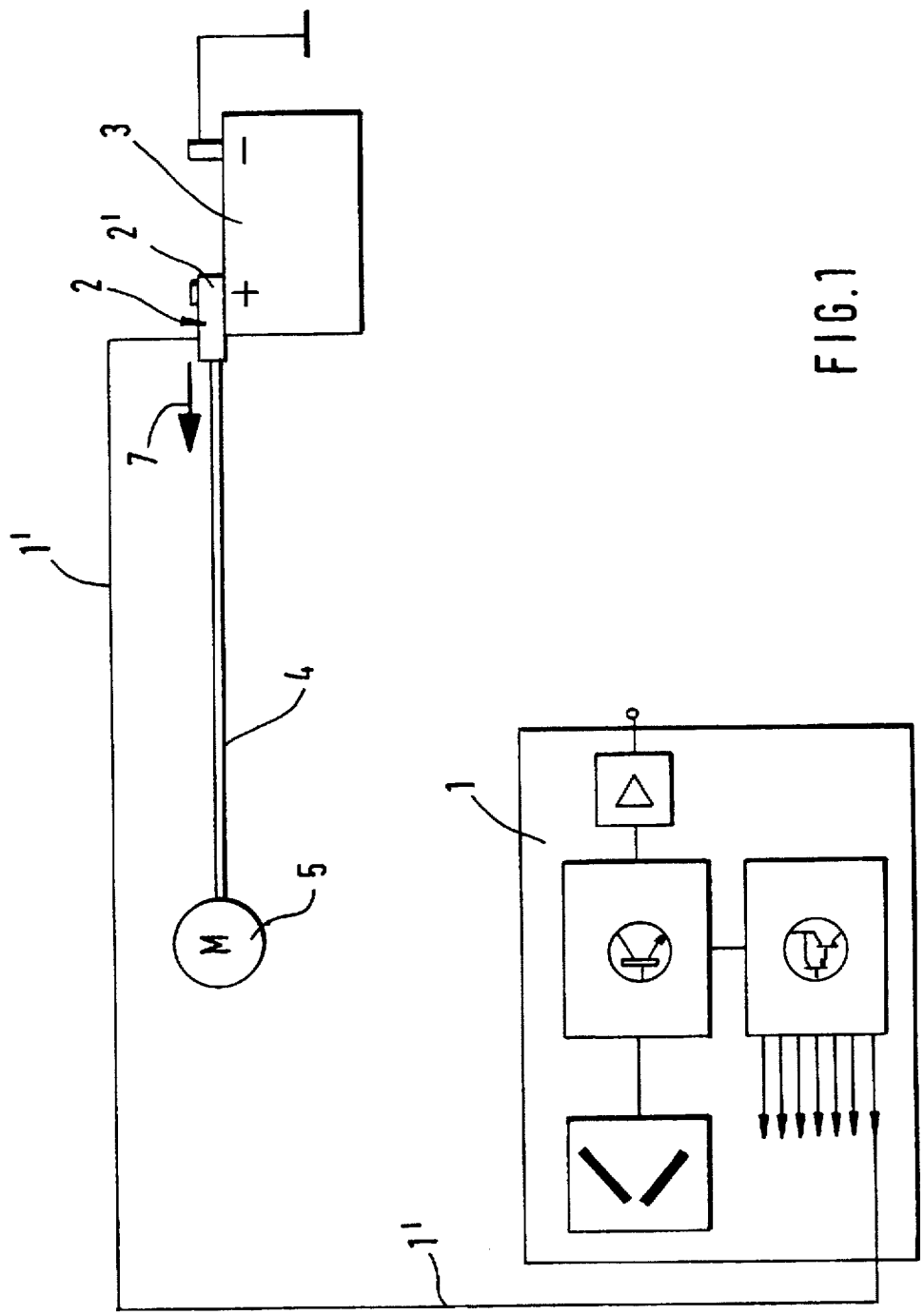

In the on-board system of a motor vehicle (not shown) there is an airbag collision safety system 1 which has a design known per se and essentially comprises a decision logic unit controlling ignition output stages for various airbags and belt tensioners (not shown). The decision logic unit is operable through a dual-channel crash sensor which evaluates a dangerous acceleration of the vehicle in two mutually perpendicular directions. In addition the collision safety system 1 also initiates other accident-conditioned functions and thus acts as a general accident sensor.

One output of the ignition output stages leads as a control line 1' to a safety separator 2 which is integral with or integrally connected to a battery cable terminal 2' and is fastened therewith directly to the positive pole of a battery or accumulator. A starter cable 4 to the starter motor 5 is fastened to the separator 2 largely without voltage drop and nevertheless in such a way as to be non-contactingly separable in the direction of arrow 7 by means of an incorporated, pyrotechnically operable, powered drive element (see FIGS. 2 to 6) upon an accident signal pulse from the collision safety system 1.

Figure 2:
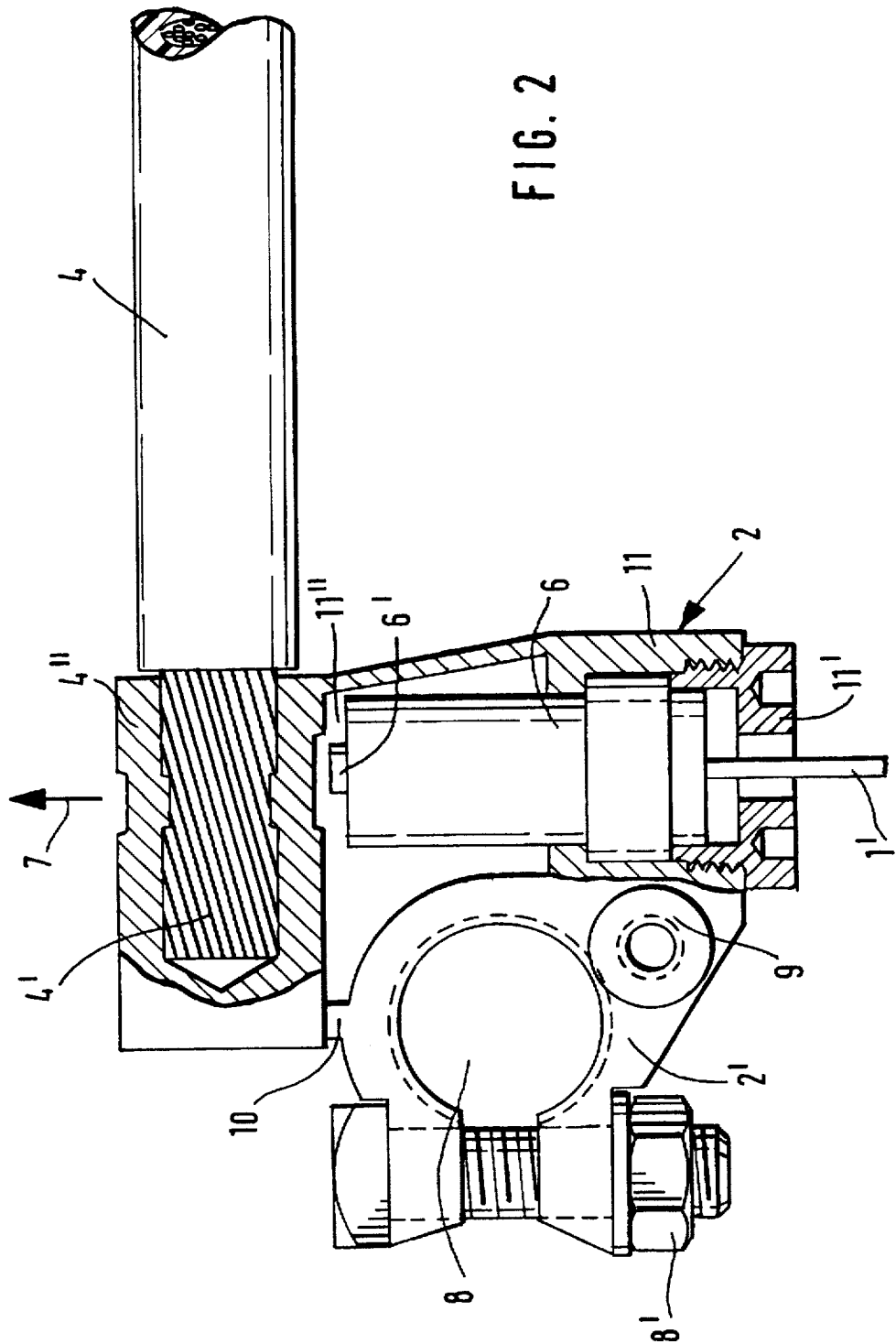

FIG. 2 depicts a plan view of an embodiment of a safety separator 2 uniting in a compact arrangement the battery cable terminal 2', the cable end 4' of the large-section and non-fused starter cable 4 and the powered drive element 6. The cable terminal 2' of conventional design has a conical clamping bore 8 with a clamping bolted connection 8' and a screw terminal 9 with female thread and flange face for further fused on-board lines, particularly for accident warning devices.

The cable end 4' is fastened in a cable-end sleeve 4" by means of a press fit and/or soldered joint or through a releasable clamping joint and is thereby fastened so as to be very large free from voltage drop. The cable-end sleeve 4' is integrally connected to the cable terminal 2' via a rupture joint 10. The powered drive element 6 is incorporated inside a housing 11 of the separator 2 by means of a screw cap 11'. The housing 11 is integral both with the battery terminal 2' and with the cable-end sleeve 4'. The drive element 6 is connected to its control line 1' through an opening in the screw cap 11'. In the present exemplary embodiment the central axis of the drive element 6 is arranged at right angles to that of the cable-end sleeve 4' and in spaced relationship to the rupture joint 10 in such a way that upon actuation of the drive element 6 the gas pressure force of the drive element 6 within the housing 11 or a piston 6' of the drive element dependably separates the cable end with cable-end sleeve 4" and thereby disconnects the battery connection of the unfused starter cable 4. Separation takes place in the direction of arrow 7, hence transversely of the direction in which the cable 4 extends.

Figure 3:
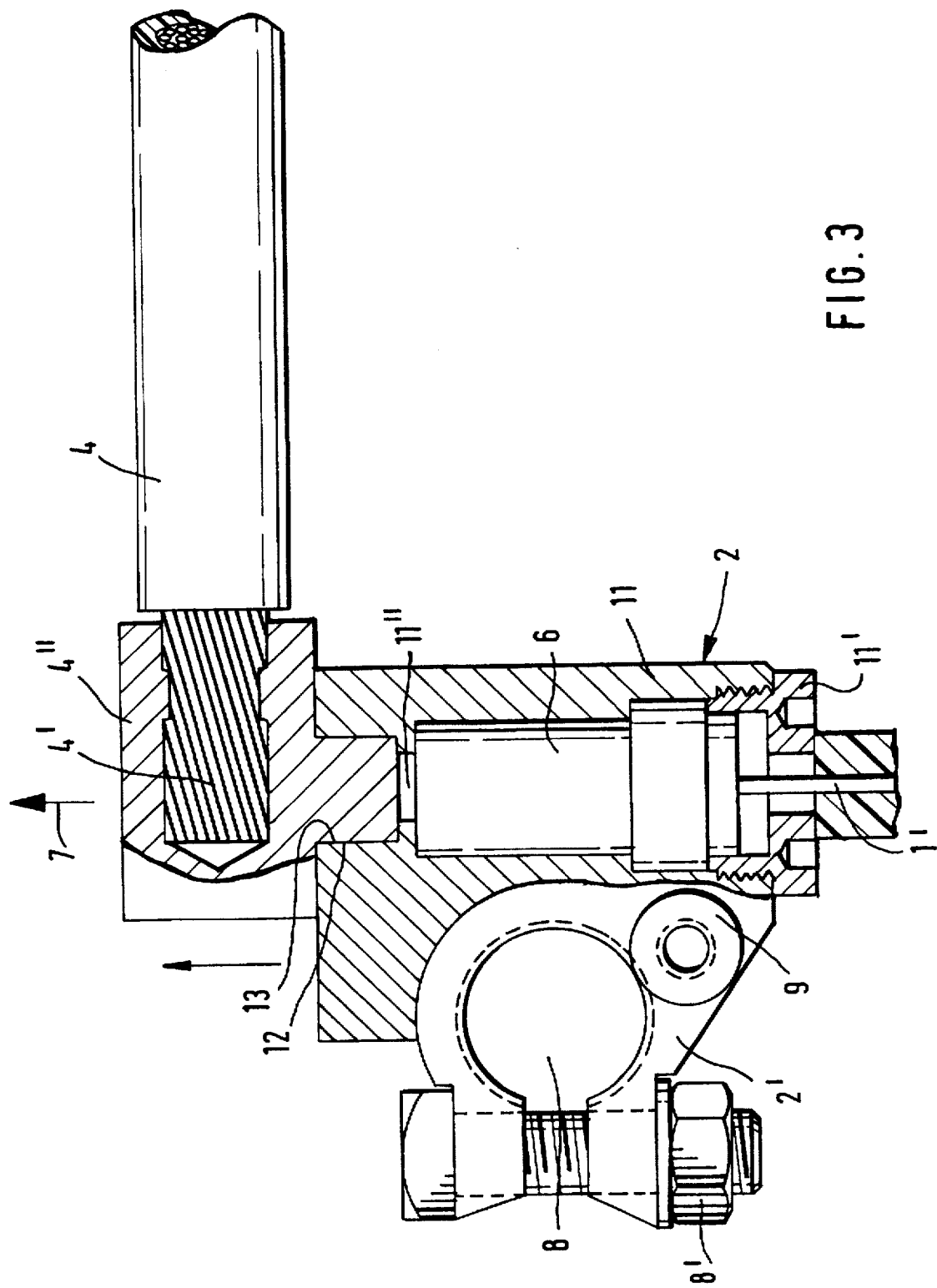

In the exemplary embodiment of FIG. 3, unlike that of FIG. 2, the cable-end sleeve 4' is fastened to the cable terminal 2' and thereby to the housing 11 of the separator 2 by means of a cylindrical seat (12, 13) with press fit or soldered joint. This cylindrical seat consists of a bore 12 in the housing 11 and a projection 13 integral with, and at right angles to, the cable-end sleeve 4'. The projection 13 is in engagement with the bore 12 by the press fit already mentioned or by soldering.

When the powered drive element 6, in the present exemplary embodiment again a pyrotechnical one, is actuated through an accident, its gas pressure force takes effect within the housing 11" and with high force ejects the projection 13 from the bore 12. Therefore the electrical contact between the housing 11 and thereby the battery 3 on the one hand and the cable-end sleeve 4' and thereby the starter cable on the other hand is dependably parted. Separation in the direction of arrow 7 again takes place transversely of the longitudinal expanse of the cable 4.

Figure 4:
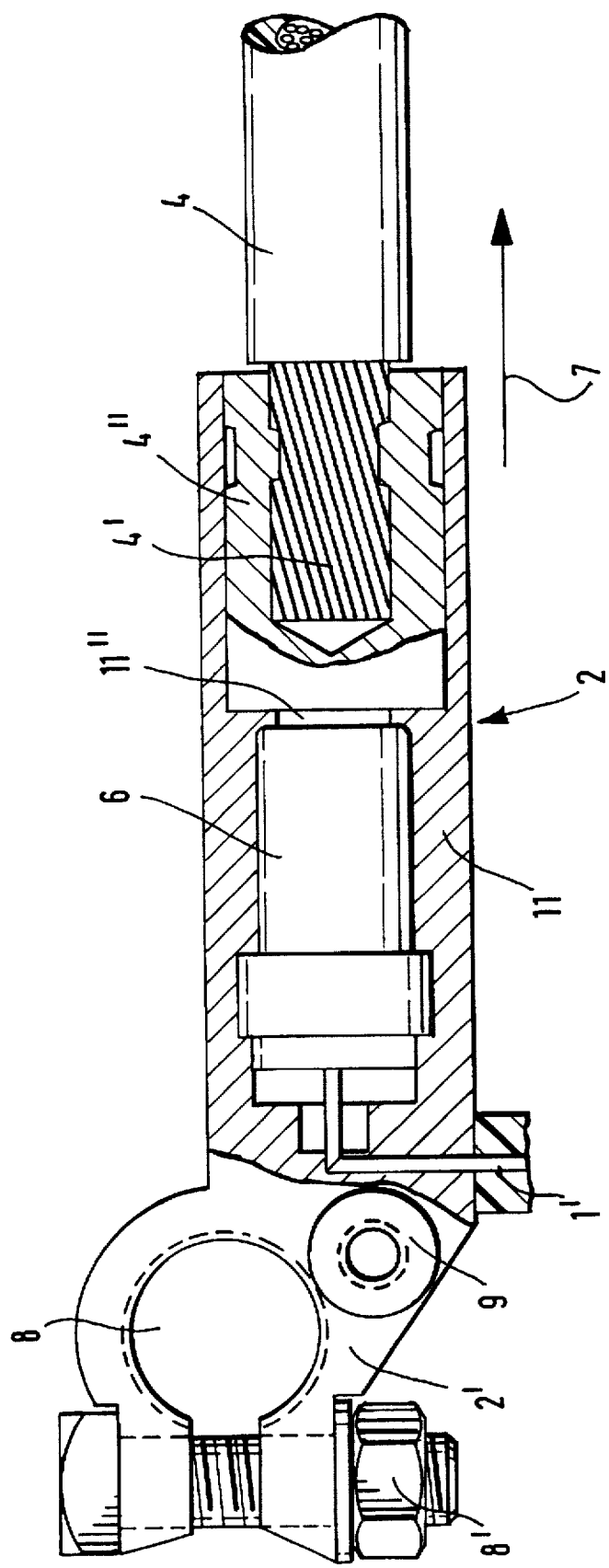
FIG. 4 is an alternative to FIG. 3, distinguished in structural form by a coaxial arrangement of a powered drive element and cable end, as opposed to the generally right-angled arrangement of FIG. 3.

In the embodiment of FIG. 4, unlike those of FIGS. 2 and 3, the cable-end sleeve 4' and the powered drive element 6 are arranged coaxially in series or in alignment with each other. The pressure force of the drive element 6 inside the housing 11" thereby acts directly on the end face of the cable-end sleeve 4". The latter is directly secured with its cylindrical external surface in the housing 11 by means of press fit, form fit and/or soldered joint with a separating force adapted to the pressure force from the drive element 6. In this embodiment the elaboracy of design is simplified further by the particularly small amount of space required exclusively in the direction of the correspondingly shortened starter cable 4 and by the absence of a lateral projection on the cable 4 and cable-end sleeve 4". The direction of separation according to arrow 7 corresponds to the orientation of the cable and its end sleeve 4".

Figure 5:
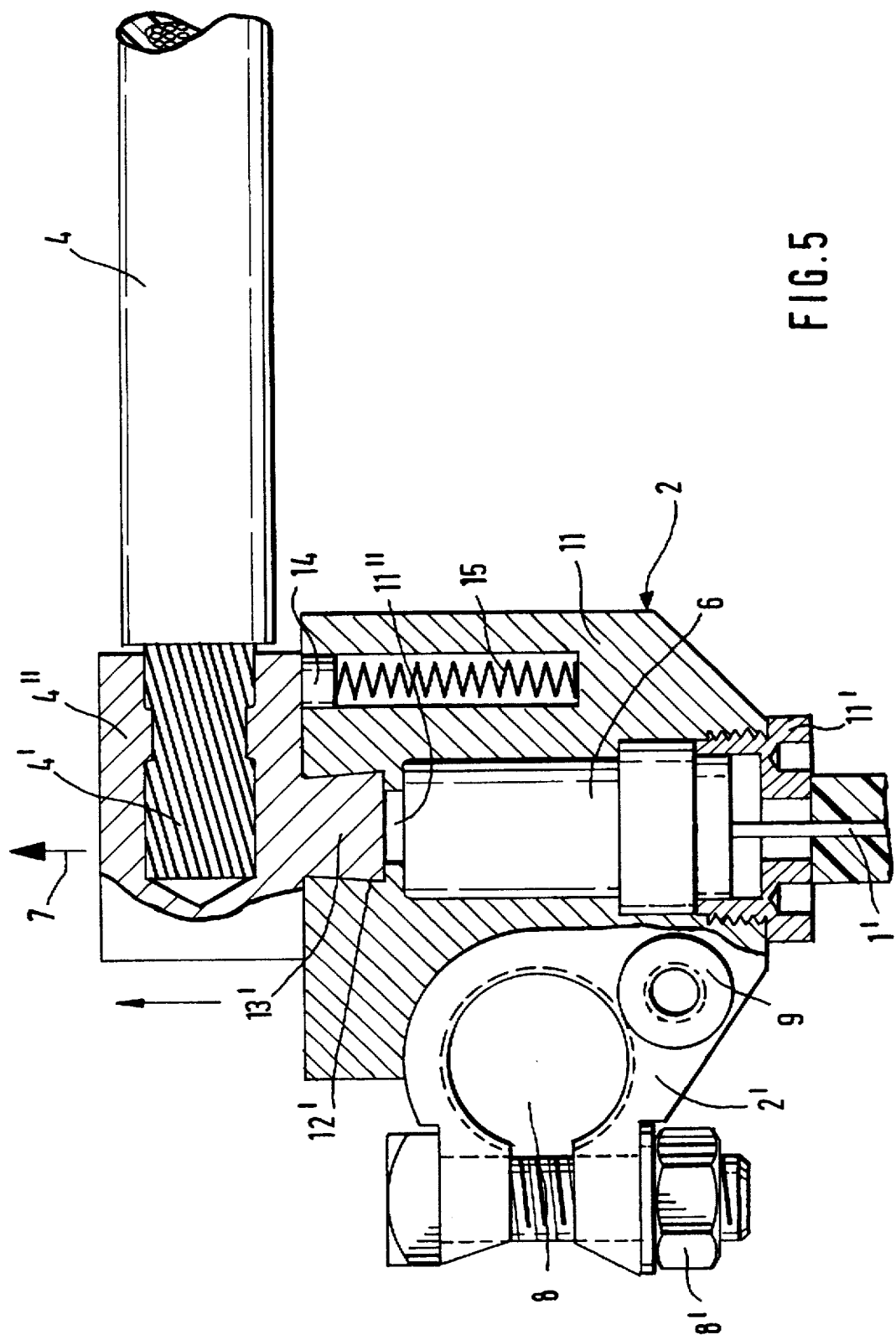
FIG. 5 is an embodiment with an undercut joint and with a spacer to counteract any contact retouch after separation and FIG. 6 is an alternative to FIG. 5 with an insulating bush at the cable end as a spacer to counteract contact retouch after separation.

The embodiment of FIG. 5 largely corresponds to that of FIG. 3. It differs only through the flaring or dovetail shape of the projection 13' formed laterally onto the cable-end sleeve 4" and through the mating conical or slot-like opening 12' receiving this projection 13' in the housing 11 of the separator 2 and through a spacer 14 with spring 15. This spacer 14 with spring 15 is mounted in the housing 11 so as to be urged by the spring 15 against the cable-end sleeve 4" and after separation of the latter a renewed contact touch with the components attached to the positive pole of the battery is precluded. If the cable-end sleeve 4" is separated in the direction of arrow 7, the spacer 14 follows it on account of the release of the spring 15 and thus prevents the cable-end sleeve 4' from being restored to a contacting position.

Figure 6:
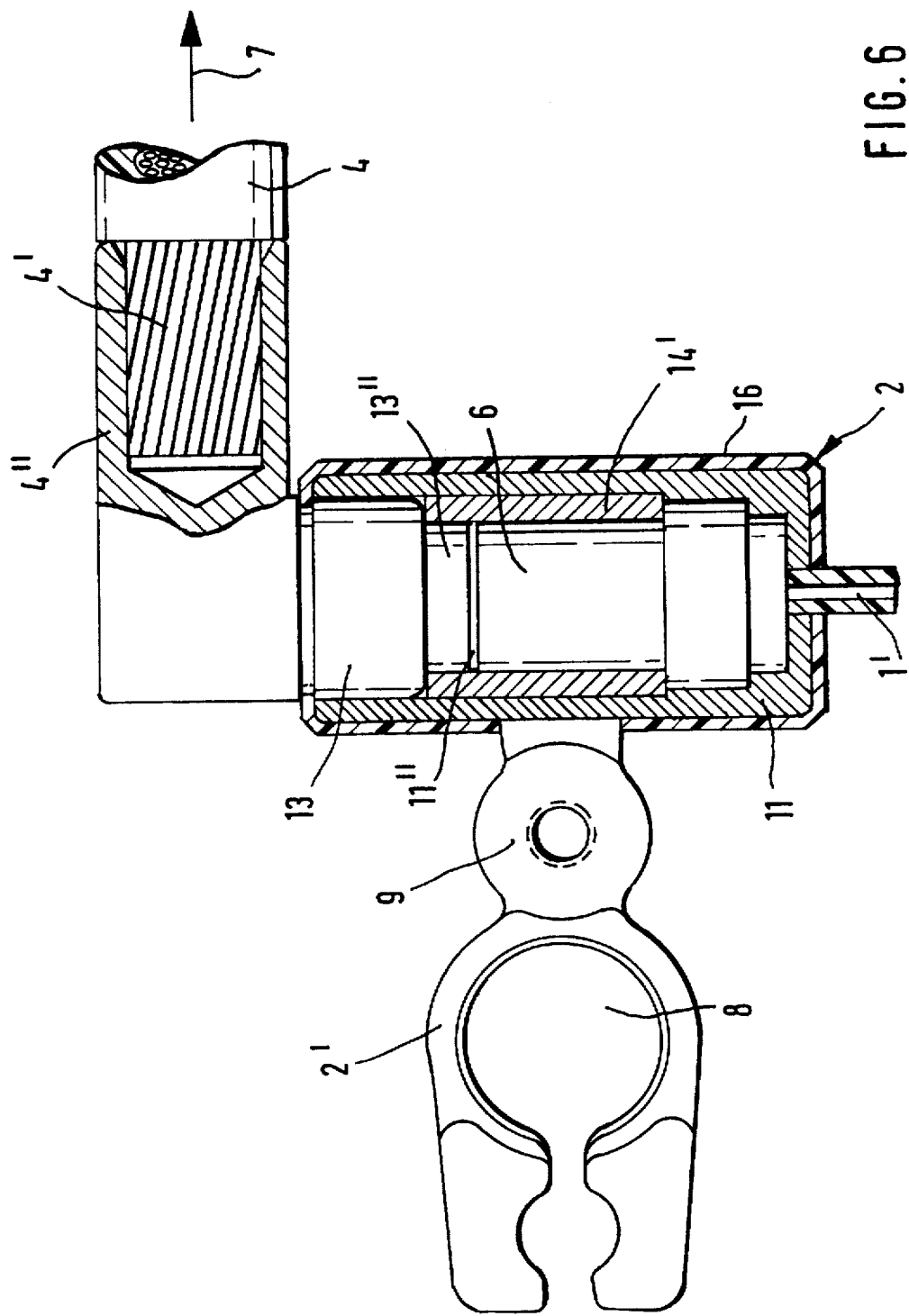

FIG. 6 depicts a modified embodiment as a development of that in FIG. 5. The material requirements and thereby weight and costs are reduced through a different association and design of the main components, cable terminal 2', screw terminal 9 and separator 2. The screw terminal 9 takes the form of a connector arranged between and integral with the cable terminal 2' and the separator 2, and the preferably cylindrical housing 11 of the separator 2 is adjoined thereto in a generally symmetrical transverse position.

The lateral cylindrical projection 13 of the cable-end sleeve 4" and the powered drive element 6 are inserted from the side of the projection 13 into the stepped cylindrical interior 11" of the housing and are held axially exclusively by means of the compatible press fit and/or soldered joint of the projection 13 in the housing 11.

An insulating bush, in the form of a spacer 14' to prevent contact after the separation, is fastened to the stepped free end 13" of the projection 13 in such a way as to remain fastened thereto when the projection 13 is ejected by the gas pressure force of the pyrotechnical drive element 6. The insulating action of the insulating bush prevents renewed electroconduutive contact touch with components (2', 9 and 11) carrying battery voltage. The housing 11 is additionally covered with an insulating sheath 16 which also precludes electroconductive contacts when laterally touching the cable-end sleeve 4".

In each of the above-described instances the battery cable terminal 2' is combined with and integrally connected to the housing 11 of the safety separator 2 to form a compact unit. An on-board cable, in the exemplary embodiment the starter cable 4, is fastened to the separator 2 in such a way as to be separated by means of an incorporated powered drive element 6 upon accident-conditioned actuation thereof through a control pulse from an accident sensor, by way of example an airbag collision safety system 1 which thereby obtains an additional function, and in such a way as to enable that if necessary other electroconductive touch contacts be prevented by means of a spacer 14, 14'. The fastener of the cable-end sleeve 4" to the housing 11 might also be a screwed connection or the like, whereby the screw(s) could have predetermined breaking points or the separation brought about by the powered drive element might be in the area of the mating thread of such a screwed connection. The cable end 4' might be detachably connected to the end sleeve 4" by means of tapered cone or any other clamping joint, whereby this end sleeve 4" might then be configured and connected to the housing 11 in the manner illustrated in the exemplary embodiments of FIGS. 2 to 6. This permits repairs in which, for example, the entire cable terminal 2' has to be detached from battery 3 and cable end 4' and replaced.

We claim:

1. A battery cable terminal comprising a cable terminal (2') having a clamping bore (8) defined therethrough for retention to a battery post for use in a vehicle, a safety separator (2) attached to the cable terminal, the safety separator (2) being adapted to be located between a battery (3) and an on-board cable end (4') of the vehicle and being operable in response to an accident, the safety separator (2) including a housing (11) having a fixed part which is integral with the cable terminal (2') and a separable fastening device (10; 12, 13) which secures the on-board cable end (4') of an on-board system, and a powered drive element (6) located between the fixed part of the housing and the cable end (4') such that when said drive element is actuated the cable end (4') is released, the powered drive element (6) has a control line (1') effecting actuation of said drive element in dependence on an accident sensor (1).

2. A battery cable terminal as claimed in claim 1, characterized in that a pyrotechnically acting, powered drive element (6) is provided between the cable end (4') and the housing (11).

3. A cable terminal as claimed in claim 1, wherein the fastening device for the cable end (4') takes the form of a disconnectable joint which is one of a press fit, a form fit, a rupture joint, and a soldered joint (10; 12, 13) disconnectable with high separating force and the powered drive element (6) is configured such that upon actuation thereof said disconnectable joint (10; 12, 13) is separated.

4. A cable terminal as claimed in claim 3, wherein first and second substantially cylindrical mounts (4", 11) arranged generally at right angles to each other are provided as supports for the cable end (4') and the powered drive element (6) the first mount being fastened via the disconnectable joint (12, 13) or being integral with the cable terminal (2') through the rupture joint (10) and the second mount being integral with the cable terminal (2').

5. A cable terminal as claimed in claim 4, wherein the powered drive element (6) has a main axis the disconnectable joint consists of one of a cylindrical projection (13) and a terminally flared (13') projection located on a cable-end sleeve (4') transversely of the main axis thereof, and further consists of a corresponding one of a cylindrical seat (12) and undercut (12') seat arranged coax/ally with the main axis of the powered drive element (6), said projection and said seat co-operating as a press fit and/or form fit.

6. A cable terminal as claimed in claim 4, wherein the powered drive element (6) has a main axis, the integral rupture joint (10) is arranged laterally spaced from the main axis of the powered drive element (6), so that a supporting point of the powered drive element; on the cable end (4') acts with a lever arm relative to the rupture joint (10).

7. A cable terminal as claimed in claim 3 wherein the disconnectable joint (10; 12, 13) is associated with the cable end (4') of a starter cable (4) connected to the positive pole of the battery and that a screw terminal (9) which is independent of a connection for the starter cable and serves for other fused on-board cables is integral with the cable terminal (2').

8. A cable terminal as claimed in claim 1, wherein a spacer (14, 14') between the cable terminal (2') aid the cable end (4') is arranged and configured such that when the cable end (4') is released, any contact with the cable terminal (2) is precluded.

9. A cable terminal as claimed in claim 8, wherein the spacer (14') comprises an insulating bush which is fastened to a stepped, cylindrical, free end (13") of a projection (13) on a cable-end sleeve (4"), projects beyond said free end (13") and is disconnectable together with the cable end (4') and the cable-end sleeve (4") from the cable terminal by means of the separator (2).

10. A cable terminal as claimed in claim 1, wherein the cable end (4') has an inner end, the cable end (4') and the powered drive element (6) are arranged in a cylindrical mount (12") having an inner end and an outer end, wherein the cable end (4') is arranged at the outer end of the cylindrical mount and the powered drive element (6) is arranged at the inner end of the cylindrical mount (12") such that the powered drive element is supported against the inner end of the cylindrical mount (12") and against the inner end of the cable end (4') such that when the powered drive element is actuated the cable end (4') is pushed out of the mount (12").

11. A battery cable terminal for a vehicle, comprising a cable terminal (2') with a clamping bore (8) defined therethrough for retention to a battery post, a safety separator (2) incorporated in the cable terminal which is adapted to be located between a battery (3) and an on-board cable end (4') and is operable in response to an accident, the safety separator (2) including a housing (11) having a fixed part which is integral with the cable terminal (2'), and a separable part which is one of connected to and formed by the cable end (4'), the separable part being held to the fixed part (11) by means of a separable fastening device (10; 12, 13), a pyrotechnically actuated, powered drive element (6) being arranged between the separable part and the fixed part, the powered drive element (6) being adapted to act on both the separable and fixed parts (4', 11) in opposite directions for separation of the separable part, and a control line (1') connected to the powered drive element (6) which effects actuation of the drive element in dependence on an accident sensor (1).

* * * * *